US012694489B2

(12) United States Patent
Yue et al.

(10) Patent No.: US 12,694,489 B2
(45) Date of Patent: Jul. 28, 2026

(54) SHORT-TERM IRRADIANCE PREDICTION METHOD BASED ON IMAGE PROCESSING AND MULTIMODAL DATA FUSION, DEVICE THEREOF AND STORAGE MEDIUM

(71) Applicant: NANJING UNIVERSITY OF POSTS AND TELECOMMUNICATIONS, Nanjing (CN)

(72) Inventors: Dong Yue, Nanjing (CN); Wenxuan Ye, Nanjing (CN); Xiangsen Wei, Nanjing (CN); Chunxia Dou, Nanjing (CN)

(73) Assignee: NANJING UNIVERSITY OF POSTS AND TELECOMMUNICATIONS, Nanjing (CN)

( * ) Notice: Subject to any disclaimer, the term of this patent is extended or adjusted under 35 U.S.C. 154(b) by 0 days.

(21) Appl. No.: 19/177,379

(22) Filed: Apr. 11, 2025

(65) Prior Publication Data

US 2026/0154793 A1 Jun. 4, 2026

(30) Foreign Application Priority Data

May 17, 2024 (CN) .......................... 202410616821.1

(51) Int. Cl.
*G06N 3/045* (2023.01)
*G06N 3/048* (2023.01)
(Continued)

(52) U.S. Cl.
CPC .............. *G06T 5/73* (2024.01); *G06N 3/045* (2023.01); *G06N 3/048* (2023.01); *G06T 5/50* (2013.01);
(Continued)

(58) Field of Classification Search
None
See application file for complete search history.

(56) References Cited

U.S. PATENT DOCUMENTS

2018/0136366 A1 5/2018 Vega-Avila et al.
2018/0373827 A1 12/2018 Meagher et al.

FOREIGN PATENT DOCUMENTS

CN 117333410 A 1/2024
WO 2017193172 A1 11/2017

OTHER PUBLICATIONS

Blanc, P., Massip, P., Kazantzidis, A., Tzoumanikas, P., Kuhn, P., Wilbert, S., Schüler, D., & Prahl, C. (2017). Short-term forecasting of high resolution local DNI maps with multiple fish-eye cameras in stereoscopic mode. In A. A. Obaidli, C. Richter, & N. Calvet (Eds.) https://doi.org/10.1063/1.498 (Year: 2017).*

(Continued)

*Primary Examiner* — Amandeep Saini
*Assistant Examiner* — Caroline Tabancay Duffy
(74) *Attorney, Agent, or Firm* — Westbridge IP LLC

(57) ABSTRACT

Disclosed are a short-term irradiance prediction method based on image processing and multimodal data fusion, a device thereof and a storage medium in the field of solar irradiance prediction. The method includes the following steps: acquiring irradiance data, and carrying out blurring processing on the irradiance data, where the irradiance data which has been subjected to blurring processing includes time information and irradiance information; converting the time information into an image layer containing the position of the sun, and drawing a circular area with the solar imaging center coordinate as the center and the radius r to obtain a time information layer image; fusing a normally exposed all-sky image, an underexposed all-sky image and a time information layer image, inputting the fused image data into a pre-built short-term solar irradiance prediction model, outputting a short-term irradiance prediction value.

8 Claims, 8 Drawing Sheets

(51) Int. Cl.
  *G06T 5/50*    (2006.01)
  *G06T 5/60*    (2024.01)
  *G06T 5/70*    (2024.01)
  *G06T 5/73*    (2024.01)
  *G06T 7/66*    (2017.01)
  *G06T 11/23*   (2026.01)

(52) U.S. Cl.
  CPC .................. *G06T 5/60* (2024.01); *G06T 5/70*
      (2024.01); *G06T 7/66* (2017.01); *G06T 11/23*
      (2026.01); *G06T 2207/20084* (2013.01); *G06T*
                                    *2207/20221* (2013.01)

(56)                References Cited

OTHER PUBLICATIONS

Paletta, Q., Arbod, G., & Lasenby, J. (2021). Benchmarking of deep learning irradiance forecasting models from sky images—An in-depth analysis. Solar Energy, 224, 855-867. https://doi.org/10.1016/j.solener.2021.05.056 (Year: 2021).*

Mercier, T. M., Sabet, A., & Rahman, T. (2024). Vision transformer models to measure solar irradiance using sky images in temperate climates. Applied Energy, 362, Article 122967. https://doi.org/10.1016/j.apenergy.2024.122967 (Year: 2024).*

Liu, Z., Lin, Y., Cao, Y., Hu, H., Wei, Y., Zhang, Z., Lin, S., & Guo, B. (2021). Swin Transformer: Hierarchical Vision Transformer using Shifted Windows. Proceedings / IEEE International Conference on Computer Vision, 9992-10002. https://doi.org/10.1109/ICCV48922.2021.00986 (Year: 2021).*

Kullback and Leibler. (1951). On Information and Sufficiency. The Annals of Mathematical Statistics, Ann. Math. Statist. 22(1), 79-86. (Year: 1951).*

First Office Action issued in counterpart Chinese Patent Application No. 202410616821.1, dated Jun. 20, 2024.

Notification to Grant Patent Right for Invention issued in counterpart Chinese Patent Application No. 202410616821.1, dated Jul. 1, 2024.

Zeng et al., Ultra-short-term Prediction Method of Distributed Photovoltaic Aggregation Based on Multi-source Data Fusion, Electic Power Information and Communication Technology, vol. 22, No. 2, pp. 9-15, dated Feb. 25, 2024.

Zhang et al., Advanced multimodal fusion method for very short-term solar irradiance forecasting using sky images and meteorological data: A gate and transformer mechanism approach, Renewable Energy, No. 216, pp. 1-17, dated Aug. 22, 2023.

* cited by examiner

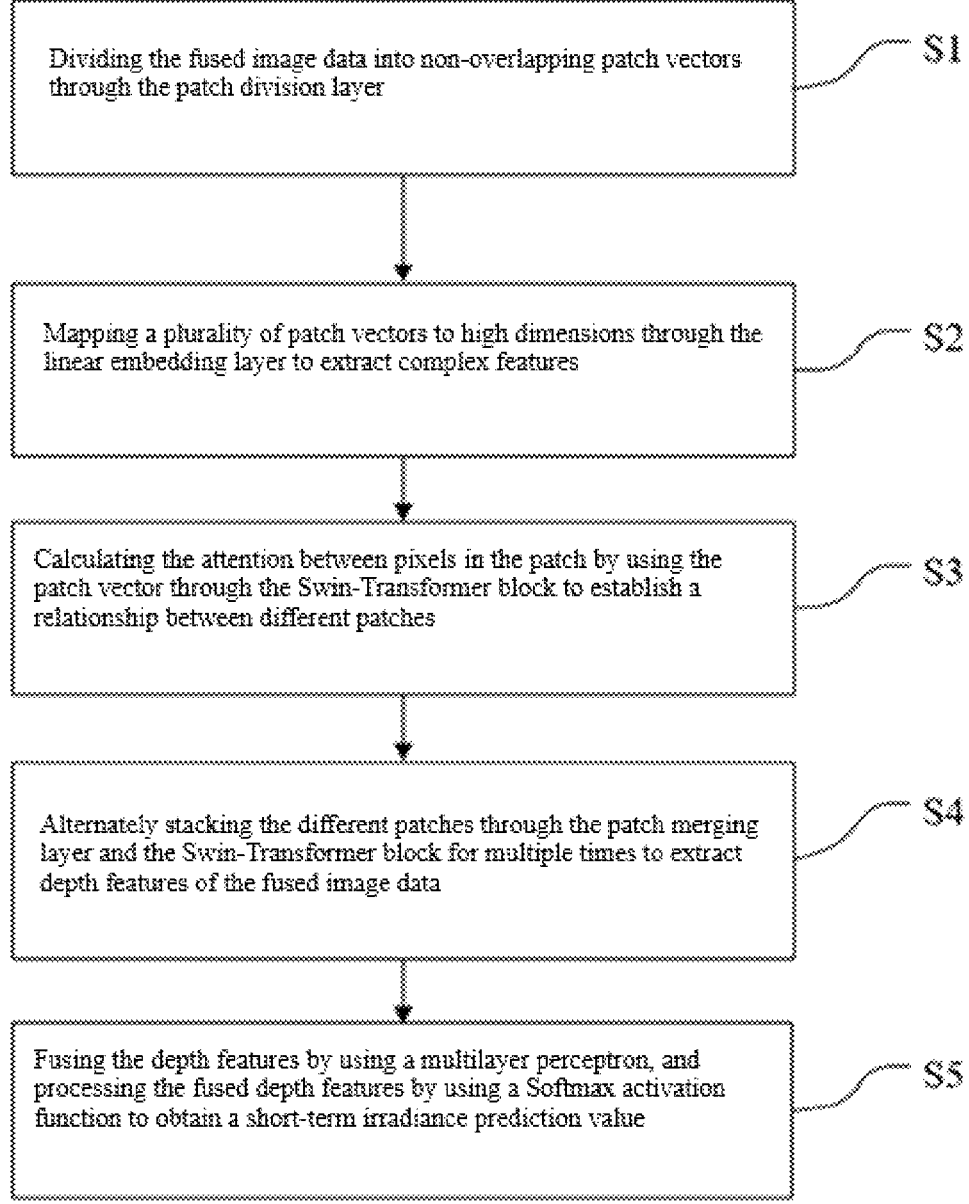

Dividing the fused image data into non-overlapping patch vectors through the patch division layer ⟋ S1

Mapping a plurality of patch vectors to high dimensions through the linear embedding layer to extract complex features ⟋ S2

Calculating the attention between pixels in the patch by using the patch vector through the Swin-Transformer block to establish a relationship between different patches ⟋ S3

Alternately stacking the different patches through the patch merging layer and the Swin-Transformer block for multiple times to extract depth features of the fused image data ⟋ S4

Fusing the depth features by using a multilayer perceptron, and processing the fused depth features by using a Softmax activation function to obtain a short-term irradiance prediction value ⟋ S5

FIG. 1

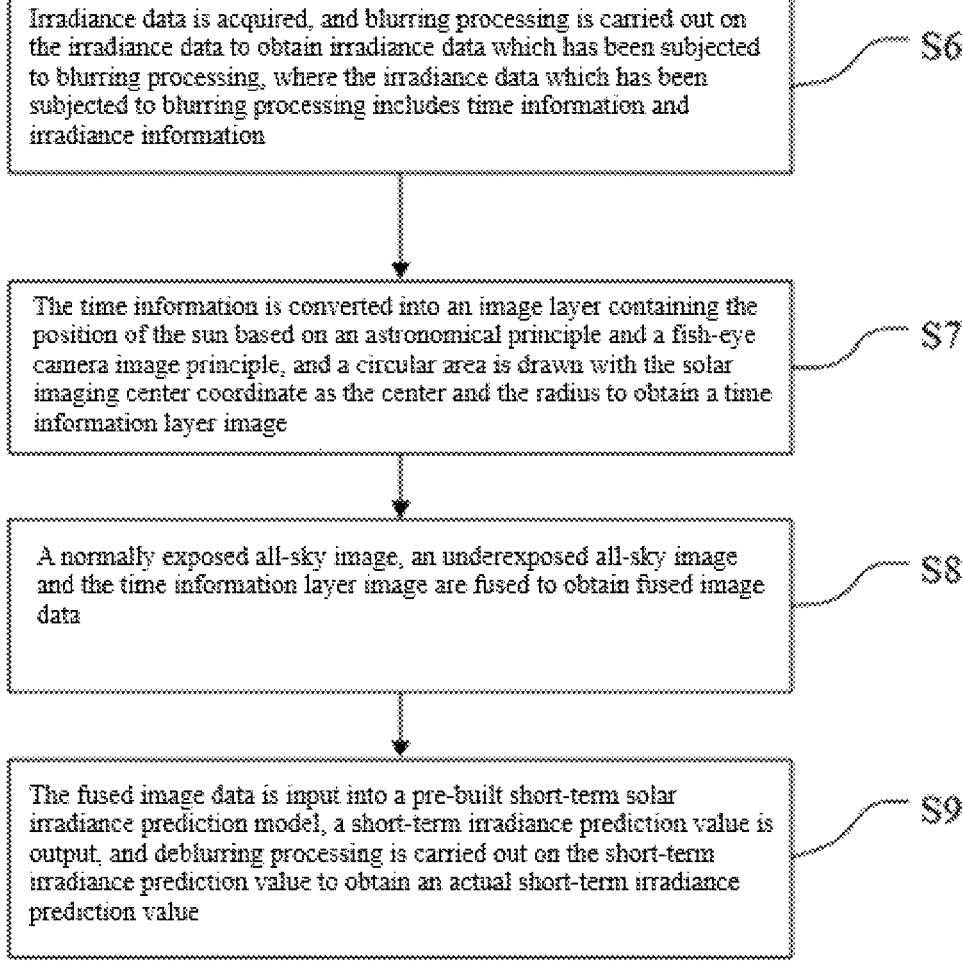

Irradiance data is acquired, and blurring processing is carried out on the irradiance data to obtain irradiance data which has been subjected to blurring processing, where the irradiance data which has been subjected to blurring processing includes time information and irradiance information — S6

The time information is converted into an image layer containing the position of the sun based on an astronomical principle and a fish-eye camera image principle, and a circular area is drawn with the solar imaging center coordinate as the center and the radius to obtain a time information layer image — S7

A normally exposed all-sky image, an underexposed all-sky image and the time information layer image are fused to obtain fused image data — S8

The fused image data is input into a pre-built short-term solar irradiance prediction model, a short-term irradiance prediction value is output, and deblurring processing is carried out on the short-term irradiance prediction value to obtain an actual short-term irradiance prediction value — S9

FIG. 2

SHORT-TERM IRRADIANCE PREDICTION METHOD BASED ON IMAGE PROCESSING AND MULTIMODAL DATA FUSION, DEVICE THEREOF AND STORAGE MEDIUM

CROSS-REFERENCE TO RELATED APPLICATIONS

This application claims priority to Chinese Patent Application No. 202410616821.1, filed on May 17, 2024, the content of which is incorporated herein by reference in its entirety.

TECHNICAL FIELD

The present disclosure relates to a short-term irradiance prediction method based on image processing and multimodal data fusion, a device thereof and a storage medium, and belongs to the technical field of solar irradiance prediction.

BACKGROUND

Solar power generation has begun to spread on a large scale around the world, but it does bring new problems and challenges to the power grid. With the increasing proportion of solar energy, the power grid needs to deal with more unstable factors, such as power fluctuation, which poses a challenge to the stability and the reliability of the power grid.

The energy of a solar power station comes from the energy received from the sun on the ground, which can be measured by global horizontal irradiation (GHI). Unlike traditional stable energy sources such as fossil energy, hydropower and nuclear energy, solar power generation is highly dependent on local weather conditions. Cloudy days, overcast conditions or other weather events will affect the GHI reaching the ground, thus affecting the power generation of solar power plants. Therefore, it is very important to accurately predict the GHI in the future for the optimal scheduling and the grid connection of solar power plants. Under cloudy or overcast weather conditions, the GHI may show strong fluctuation features because of the chaotic features of the change in movement and shape of clouds. Under special cloudy weather conditions, the change of the GHI in one minute can even be up to 80% of the maximum irradiance of the day, which leads to strong uncertainty of solar power generation. When a large number of solar power plants are connected to the power grid, this strong fluctuation will greatly reduce the stability of the operation of the power grid. Generally speaking, in order to eliminate the influence of the uncertainty of the output of solar power plants, the power grid needs to reserve more backup resources, and the safety device of the power grid also needs to act frequently to ensure the balance between supply and demand of the power grid, which will lead to the increase of the operation cost of the power grid and a waste of resources. If the photovoltaic output fluctuates too much in a short time, the power grid actuator fails to act in time or the backup resources are insufficient. The voltage and the frequency of the power grid may seriously exceed the limit, which even leads to large-scale power grid breakdown.

In order to reduce the operating cost of solar power plants and improve the utilization rate and the capacity of solar energy resources in the power grid, it is necessary to quantify the changes of the regional GHI in the future by using the irradiance prediction method. In addition, power grid operators can use the predicted GHI as a reference value to provide data support for automatic power generation control of the power grid, so as to more effectively schedule power generation resources and improve the stability and the economic efficiency of the power grid. Therefore, the solar radiation prediction technology has been fully developed in recent years. The irradiance prediction methods can be divided into two categories: a method based on time sequence data and a method based on image data. The method based on time sequence data expects to analyze the distribution pattern of irradiance from the past time sequence, and on this basis, a CEEMDAN-CNN-LSTM model for hourly irradiance prediction is proposed for prediction. The disadvantage of the model is that the model cannot quantify the influence of clouds on irradiance. Therefore, the model focuses on medium- and long-term irradiance prediction, and the prediction accuracy is limited. The irradiance prediction method based on image data can capture the influence of cloud movement on irradiance more intuitively. Such method usually uses cloud images taken by the ground or the satellite to predict the change of irradiance in the future through the image processing and machine learning algorithm. On this basis, a deep learning model is proposed to identify the moving trend of clouds in satellite images and predict the irradiance of the target area in combination with ground measurement. The advantage of these methods is that these methods can predict the moving trend of clouds in a large scale, so as to be very suitable for large-scale regional prediction. The disadvantage is that it is difficult for these methods to accurately predict the small-level change of the Global Horizontal Irradiance (GHI) in a small scale.

SUMMARY

The present disclosure aims to overcome the shortcomings in the prior art and provide a short-term irradiance prediction method based on image processing and multimodal data fusion, a device thereof and a storage medium, which can more accurately and stably predict solar radiation and realize ultra-high-precision irradiance prediction in a short time scale.

In order to solve the above technical problems, the present disclosure is realized by using the following technical scheme.

In a first aspect, the present disclosure provides a short-term irradiance prediction method based on image processing and multimodal data fusion, including the following steps:

acquiring irradiance data, and carrying out blurring processing on the irradiance data to obtain irradiance data which has been subjected to blurring processing, where the irradiance data which has been subjected to blurring processing includes time information and irradiance information;

calculating a solar imaging center coordinate based on an astronomical principle and a fish-eye camera image principle, and drawing a circular area with the solar imaging center coordinate as the center and the radius r to generate a time information layer image;

fusing the time information layer image with a normally exposed all-sky image and an underexposed all-sky image which are acquired in advance to obtain fused image data; and inputting the fused image data into a pre-built short-term solar irradiance prediction model, outputting a short-term irradiance prediction value, and carrying out deblurring processing on the short-term irradiance prediction value to obtain an actual short-term irradiance prediction value; where taking the irradiance data which has been subjected to blurring processing as the target data, the similarity between the actual short-term irradiance prediction value and the target data is calculated by using a KullbackLeibler loss function.

In combination with the first aspect, further, the calculation expression of carrying out blurring processing on the irradiance data is as follows:

$$y = \frac{1}{\sqrt{2\pi}\,\sigma} e^{\frac{-(v-y_m)}{2\sigma^2}} \; ;$$

where $y_m$ denotes an average global horizontal irradiance value within a predicted time scale; y denotes the result of blurring of the average global horizontal irradiance; $\sigma$ denotes a Gaussian blur variance; v denotes an irradiance data set, and $\pi$ denotes the ratio of the circumference of a circle to its diameter.

In combination with the first aspect, further, generating a time information layer image includes:

calculating a zenith angle and a solar azimuth angle at local shooting time according to the astronomical principle, and calculating a solar imaging radius according to the fish-eye camera;

using the solar azimuth angle to calculate the solar imaging center coordinate at the local shooting time based on the solar imaging radius;

obtaining the time information layer image by drawing a circular area with the solar imaging center coordinate as the center and the radius r on a background image layer with a preset size.

In combination with the first aspect, further, the expression of calculating a zenith angle and a solar azimuth angle at local shooting time is as follows:

$$h_a = 15 \times (t + (L - L_h) - 12);$$

$$\delta = -23.44° \times \cos\left(\frac{2\pi}{365}(N' + 10)\right);$$

$$\theta_s = 90° - \arcsin(\cos h_a \cos \delta \cos \phi + \sin \delta \sin \phi);$$

$$\Psi = \arccos\left(\frac{\sin \delta - \cos \theta_s \sin \phi}{\sin \theta_s \cos \phi}\right);$$

where $h_a$ denotes a solar hour angle at the shooting time; t denotes the time when the all-sky image is taken; L denotes the longitude of the shooting location; $L_h$ denotes a time zone center line at the shooting location; $\delta$ denotes a declination at the shooting time; N' denotes the number of days in a year; $\theta_s$ denotes a zenith angle at the local shooting time; $\psi$ denotes a solar azimuth angle at the shooting time; $\phi$ denotes the longitude and the latitude of the time zone center line.

In combination with the first aspect, further, calculating a solar imaging radius according to the fish-eye camera includes:

using a nonlinear fitting method to perform nonlinear correction on the imaging angle for imaging positioning, in which the nonlinear correction has a formula of:

$$\theta = \frac{\log(180 - \theta_s)}{\log 90} \times \theta_s;$$

where $\theta$ denotes a viewing angle after the nonlinear correction;

calculating the solar imaging radius based on the determined imaging positioning, in which the expression of calculating the solar imaging radius is as follows:

$$l = \left(\frac{\theta}{90} \times R\right);$$

where l denotes a solar imaging radius; R denotes a pixel radius of the all-sky image.

In combination with the first aspect, further, the short-term solar irradiance prediction model includes a patch division layer, a linear embedding layer, a Swin-Transformer block and a patch merging layer.

In combination with the first aspect, further, inputting the fused image data into a pre-built short-term solar irradiance prediction model includes:

dividing the fused image data into non-overlapping patch vectors through the patch division layer;

mapping a plurality of patch vectors to high dimensions through the linear embedding layer to extract complex features;

calculating the attention between pixels in the patch by using the patch vector through the Swin-Transformer block to establish a relationship between different patches;

alternately stacking the different patches through the patch merging layer and the Swin-Transformer block for multiple times to extract depth features of the fused image data;

fusing the depth features by using a multilayer perceptron, and processing the fused depth features by using a Softmax activation function to obtain a short-term irradiance prediction value.

In combination with the first aspect, further, the expression of calculating the KullbackLeibler loss function is as follows:

$$J(W) = \sum_i^N \sum_j^M y_{ij} \log\left(\frac{y_{ij}}{\hat{y}_{ij}}\right);$$

where J(W) denotes a loss value of the prediction model; N denotes the number of samples in a data set; M denotes the number of elements in each sample in the data set; i denotes a sample index; j denotes an element index in each sample; $y_{ij}$ denotes a j-th element of an i-th sample; $\hat{y}_{ij}$ denotes a j-th element of an i-th value output by the short-term irradiance prediction model.

In a second aspect, a short-term irradiance prediction device based on image processing and multimodal data fusion is provided, including:

a blurring processing module, which is configured to acquire irradiance data, and carry out blurring processing on the irradiance data to obtain irradiance data which has been subjected to blurring processing, where the irradiance data which has been subjected to blurring processing includes time information and irradiance information;

a time information layer image generation module, which is configured to convert the time information into an image layer containing the position of the sun based on an astronomical principle and a fish-eye camera image principle, and draw a time information layer image with the solar imaging center coordinate as the center and the radius r;

an image fusion module, which is configured to fuse a normally exposed all-sky image, an underexposed all-sky image and the time information layer image to obtain fused image data; and a prediction module, which is configured to input the fused image data into a pre-built short-term solar irradiance prediction model, output a short-term irradiance prediction value, and carry out deblurring processing on the short-term irradiance prediction value to obtain an actual short-term irradiance prediction value; where taking the irradiance data which has been subjected to blurring processing as the target data, the similarity between the short-term irradiance prediction value and the target data is calculated by using a KullbackLeibler loss function.

In a third aspect, a computer-readable storage medium is provided, on which a computer program is stored, where the program, when executed by a processor, implements the steps of the method.

Compared with the prior art, the present disclosure has the following beneficial effects.

In the present disclosure, blurring processing is carried out on the acquired irradiance data, and the time information in the irradiance data is converted into an image layer containing the imaging position of the sun, so that the conversion from the time mode to the image mode is realized, thereby generating a single-layer image with time information. The image data of seven layers of channels are formed after fusing three layers of normally exposed all-sky images, three layers of underexposed all-sky images and a single layer of time information layer images. The image data of seven layers of channels is input into the short-term solar radiation prediction model, so as to output the short-term solar irradiance prediction value and realize the irradiance prediction in a short time scale. Thereafter, deblurring processing is carried out on the output prediction value, so as to realize the effect of high-precision irradiance prediction in a short time scale.

BRIEF DESCRIPTION OF THE DRAWINGS

FIG. 1 is a schematic diagram of the step of outputting a short-term irradiance prediction value in an embodiment of the present invention.

FIG. 2 is a flow chart of a short-term irradiance prediction method based on image processing and multimodal data fusion according to an embodiment of the present disclosure.

DETAILED DESCRIPTION OF THE EMBODIMENTS

The technical scheme of the present disclosure will be described in detail with reference to the attached drawings and the detailed description hereinafter. It should be understood that the embodiments of the present disclosure and the specific features in the embodiments are detailed descriptions of the technical scheme of the present disclosure, rather than limitations on the technical scheme of the present disclosure. In case of no conflict, the embodiments of the present disclosure and the technical features in the embodiments can be combined with each other.

In the present disclosure, the term "and/or" is merely used to describe the associative relationship of associated objects, which indicates that there can be three relationships. For example, A and/or B can indicate that A exists alone, A and B exist at the same time, and B exists alone. In addition, the character "/" in the present disclosure generally indicates that the context associated objects form an "OR" relationship.

In Embodiment 1, FIG. 2 is a flow chart of a short-term irradiance prediction method based on image processing and multimodal data fusion according to Embodiment 1 of the present disclosure. The flow chart only shows the logical order of the method described in this embodiment. The steps shown or described can be completed in a different order from that shown in FIG. 2 in other possible embodiments of the present disclosure on the premise of not conflicting with each other.

As shown in FIG. 2, the method in this embodiment specifically includes the following steps.

S6: irradiance data is acquired, and blurring processing is carried out on the irradiance data to obtain irradiance data which has been subjected to blurring processing, where the irradiance data which has been subjected to blurring processing includes time information and irradiance information.

Specifically, the calculation expression of carrying out blurring processing on the irradiance data is as follows:

$$y = \frac{1}{\sqrt{2\pi}\,\sigma} e^{\frac{-(v - y_m)}{2\sigma^2}} \; ;$$

where $y_m \in R$ denotes an average Global Horizontal Irradiance (GHI) value within a predicted time scale; $y \in R^{1*M}$ denotes the result of blurring of the average global horizontal irradiance; $\sigma$ denotes a Gaussian blur variance; $v$ denotes an irradiance data set, and $v = [0, 1, 2, \ldots, M]$.

Figure 11:
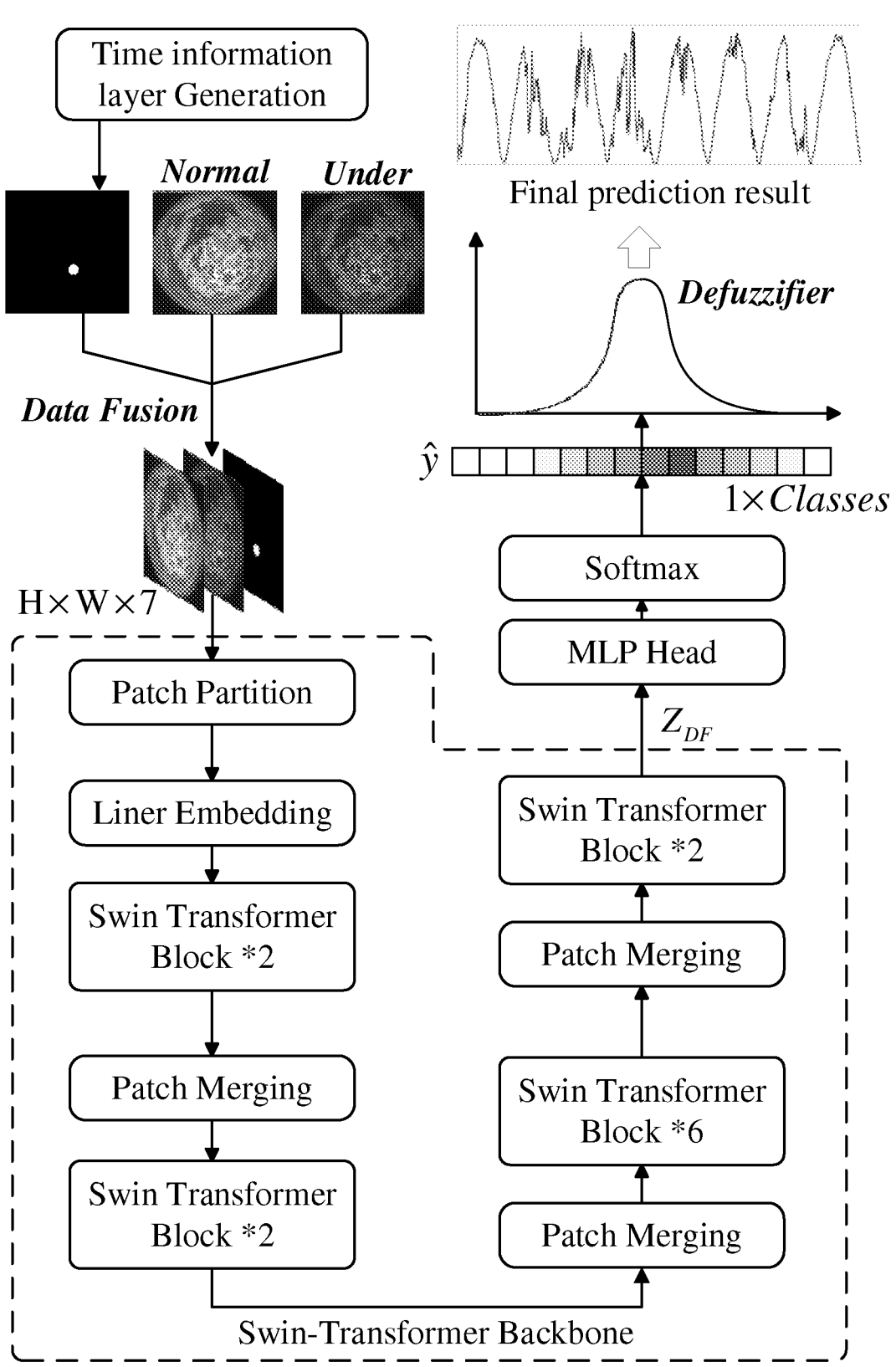
FIG. 11 is a schematic structural diagram of a short-term irradiance prediction model according to an embodiment of the present disclosure.
Figure 12:
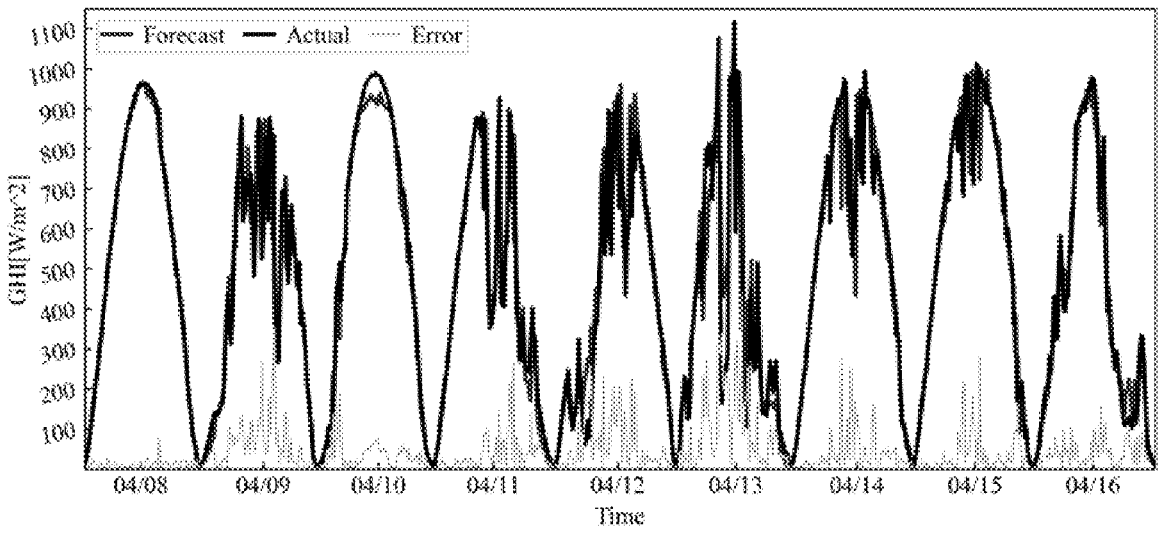
FIG. 12 is an error diagram between a short-term irradiance prediction value and a real value according to an embodiment of the present disclosure.

It should be noted that the present disclosure selects the typical 112-day data from January 2020 to January 2022 as the training set, the 18-day data as the verification set, and the data of all days in April 2022 as the test set (some test set data are shown in FIG. 11 and FIG. 12 below).

S7: a solar imaging center coordinate is calculated based on an astronomical principle and a fish-eye camera image principle, and a circular area is drawn with the solar imaging center coordinate as the center and the radius r to obtain a time information layer image.

Specifically, the process of obtaining a time information layer image is as follows.

a zenith angle and a solar azimuth angle at local shooting time are calculated according to the astronomical principle.

Figure 3:
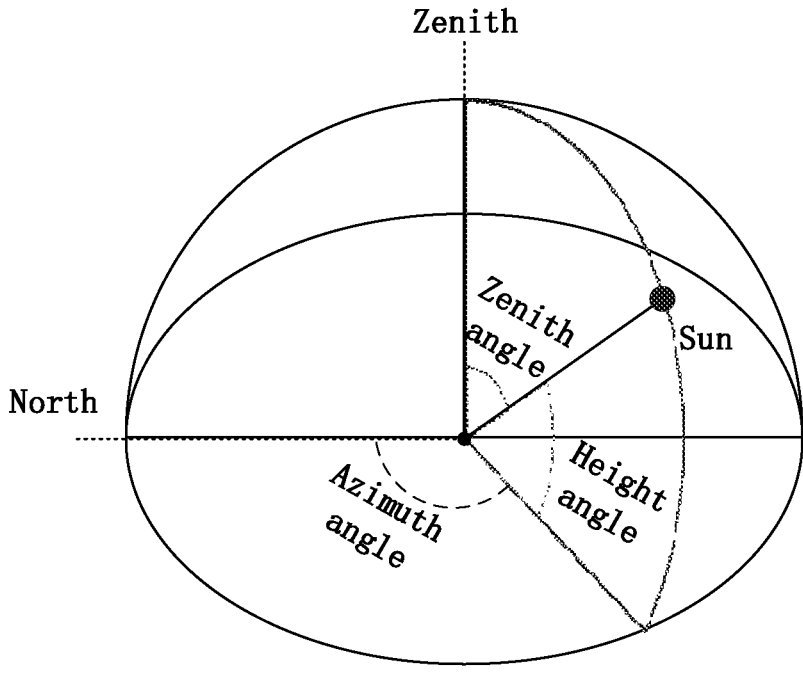
FIG. 3 is a schematic diagram of a zenith angle and a solar azimuth angle according to an embodiment of the present disclosure.

As shown in FIG. 3, the expression of calculating a zenith angle and a solar azimuth angle is as follows:

$$\delta = -23.44° \times \cos\left(\frac{2\pi}{365}(N+10)\right);$$

$$\theta_s = 90° - \arcsin(\cosh_a \cos\delta\cos\phi + \sin\delta\sin\phi);$$

$$\Psi = \arccos\left(\frac{\sin\delta - \cos\theta_s\sin\phi}{\sin\theta_s\cos\phi}\right);$$

where $h_a$ denotes a solar hour angle at the shooting time; t denotes the time when the all-sky image (ASI) is taken; L denotes the longitude of the shooting location; $L_h$ denotes a time zone center line at the shooting location; $\delta$ denotes a declination at the shooting time; N denotes the number of days in a year; $\theta_s$ denotes a zenith angle at the local shooting time; $\Psi$ denotes a solar azimuth angle at the shooting time; $\phi$ denotes the longitude and the latitude of the time zone center line.

a solar imaging radius is calculated according to the fish-eye camera.

Figure 4:
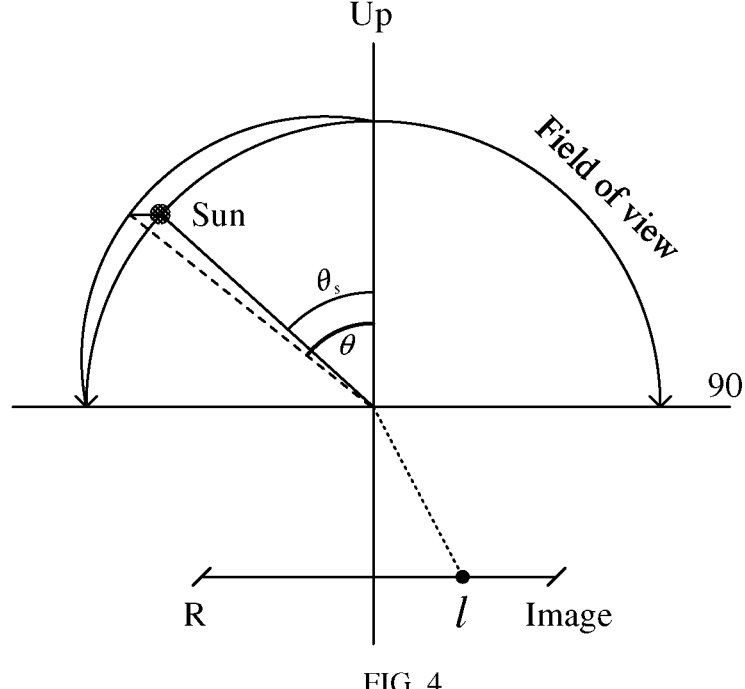
FIG. 4 is a schematic diagram of a fish-eye camera lens mapping a field of view into concentric circles according to an embodiment of the present disclosure.

Specifically, as shown in FIG. 4, the ground all-sky camera uses the lens of a fish-eye camera, which maps a hemispherical field of view to a circular image conformal to the image plane. For the lens of a fish-eye camera, the image radius is linearly related to the viewing angle, and the whole field of view will be mapped into a concentric circle.

Figure 5:
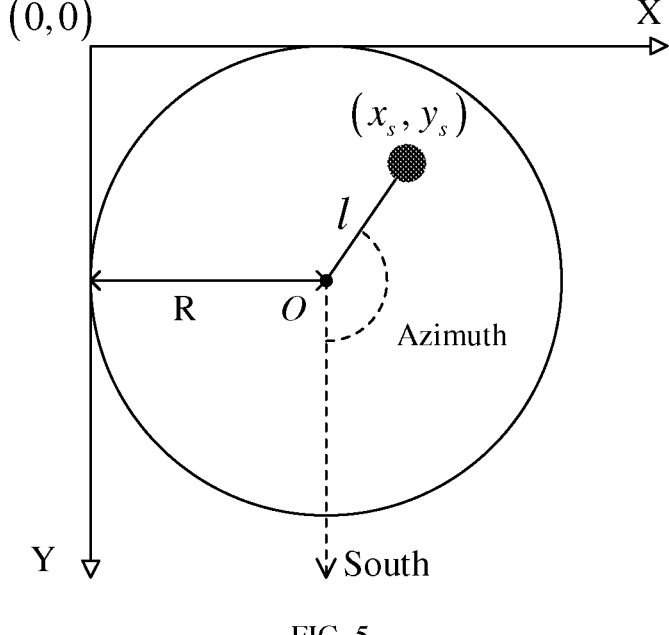
FIG. 5 is a schematic diagram of a solar imaging radius according to an embodiment of the present disclosure.

As there is curvature distortion in the imaging of the fish-eye camera lens, as shown in FIG. 5, in order to obtain accurate solar imaging coordinates, it is necessary to use a nonlinear fitting method to perform nonlinear correction on the imaging angle to obtain imaging positioning, and calculate the solar imaging radius based on the corrected imaging angle. The expressions of the nonlinear fitting and the solar imaging radius are as follows:

$$\theta = \frac{\log(180 - \theta_s)}{\log 90} \times \theta_s;$$

$$l = \left(\frac{\theta}{90} \times R\right);$$

where $\theta$ denotes a viewing angle after the nonlinear correction; l denotes a solar imaging radius; R denotes a pixel radius of the all-sky image; and $\theta_s$ denotes a zenith angle at the shooting time.

the solar azimuth angle is used to calculate the solar imaging center coordinate at the local shooting time after determining the solar imaging radius.

Figure 6:
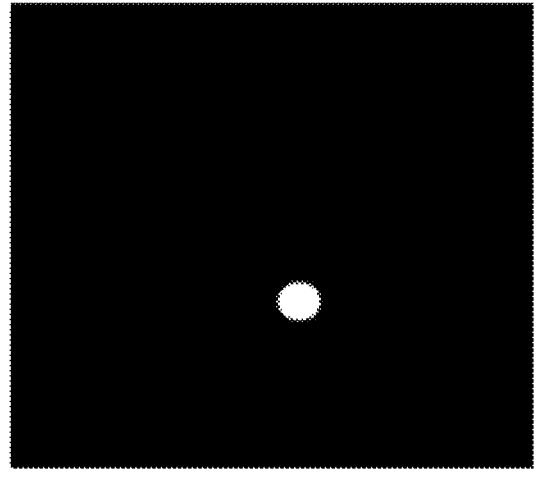
FIG. 6 is a schematic diagram of generating a time information layer image according to an embodiment of the present disclosure.

Specifically, the expression of calculating the solar imaging center coordinate is as follows:

$$m = R - l \times \sin\psi;$$

$$n = R - l \times \sin\psi;$$

where m is a horizontal pixel value of solar imaging; and n is the vertical pixel value of solar imaging.

as shown in FIG. 6, a white circular area with the solar imaging center coordinate as the center and the radius r is drawn on a pure black background image with a pixel length of H and a width of W, and the drawn white circular area is the time information layer image.

Figure 7:
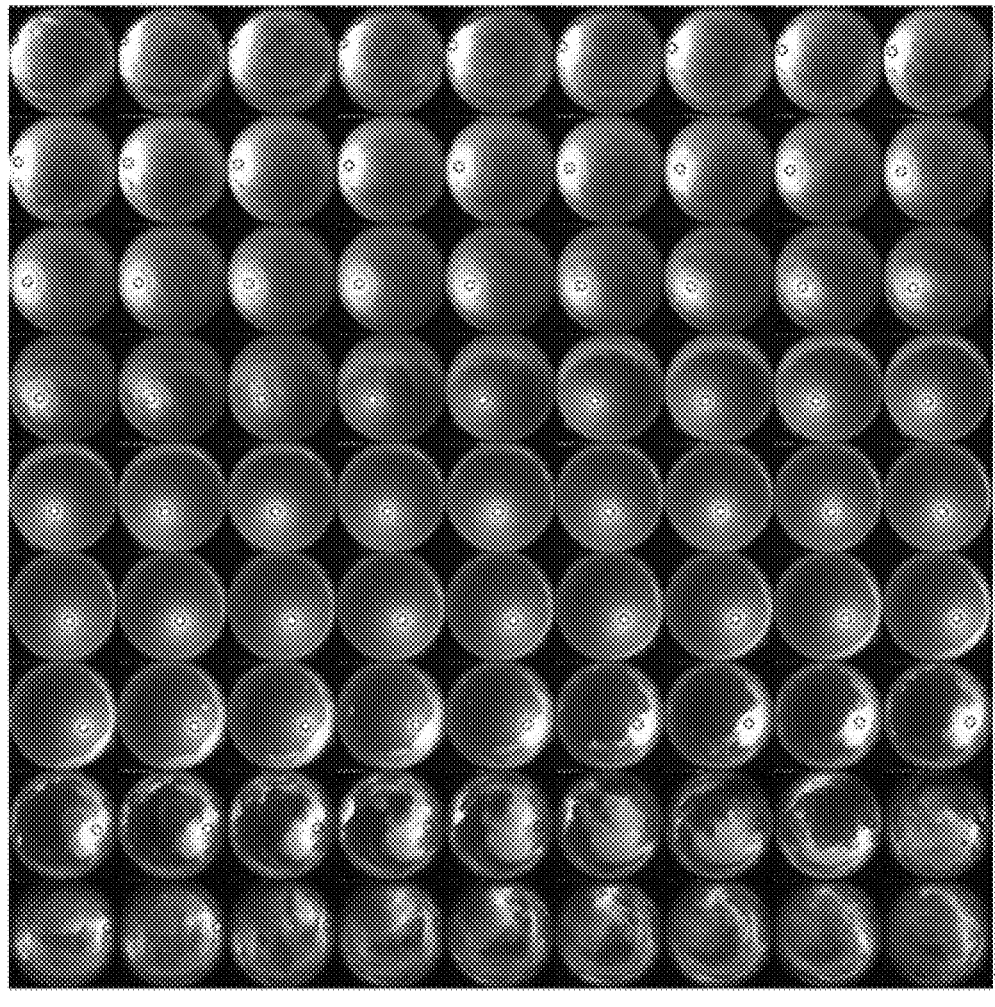
FIG. 7 is a schematic diagram of a solar imaging position in a all-sky image matrix according to an embodiment of the present disclosure.

Further, as shown in FIG. 7, each single image can be seen from the all-sky image matrix based on the sun position information obtained above, and the red circle of the solar imaging position indicates that the imaging position coincides with the actual solar imaging position, which verifies that the solar imaging positioning method based on time data proposed in the present disclosure is accurate enough.

S8: a normally exposed all-sky image, an underexposed all-sky image and the time information layer image are fused to obtain fused image data.

Figure 8:
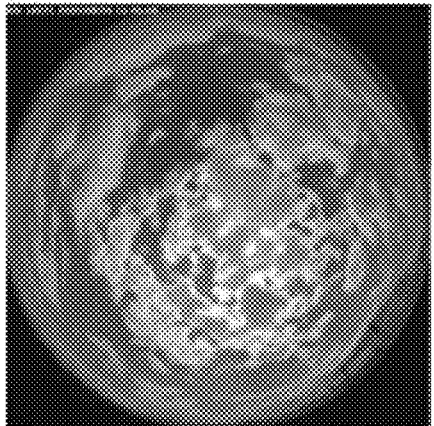
FIG. 8 shows a normally exposed all-sky image according to an embodiment of the present disclosure.
Figure 9:
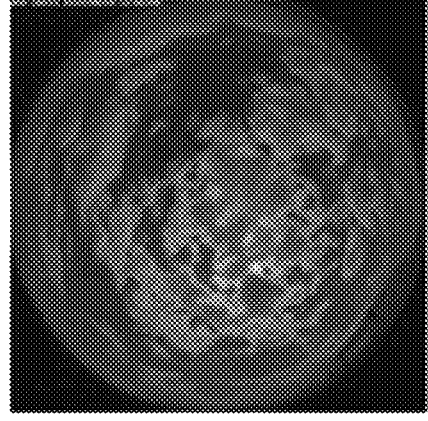
FIG. 9 shows an underexposed all-sky image according to an embodiment of the present disclosure.
Figure 10:
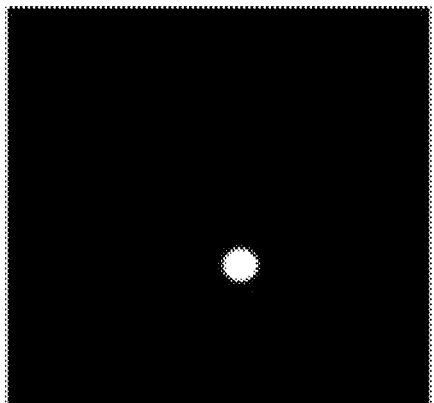
FIG. 10 shows a single layer of time information layer images according to an embodiment of the present disclosure.

Specifically, FIG. 8 shows a normally exposed all-sky image with three layers of channels;

FIG. 9 is an underexposed all-sky image with three layers of channels; FIG. 10 is a time information layer image, which is a single-layer image. After the three images are fused, image data with seven layers of channels is obtained.

Further, the expression of calculating the image data with seven layers of channels is as follows:

$$x = CONCAT(Img1, Img2, Img3);$$

where $x \in R^{H*W*7}$ denotes the fused data; H denotes the height of the image; W denotes the width of the image, Im g $1 \in R^{H*W*3}$ denotes a normally exposed all-sky image; Im g $2 \in R^{H*W*3}$ denotes an underexposed all-sky image; Im g $3 \in R^{H*W*1}$ denotes a time information layer image; CONCAT denotes a fusion operation.

S9: the fused image data is input into a pre-built short-term solar irradiance prediction model, and a short-term irradiance prediction value is output.

Taking the irradiance data which has been subjected to blurring processing as the target data, the similarity between the actual short-term irradiance prediction value and the target data is calculated by using a KullbackLeibler loss function.

Specifically, as shown in FIG. 11, the present disclosure uses the ST (Swin-Transformer) module as the backbone network of the solar irradiance prediction model, and the backbone network includes four ST blocks, that is, a patch dividing layer, a linear embedding layer, a Swin-Transformer block and a patch merging layer. In the embodiment of the present disclosure, the ST blocks are configured with {2, 2, 6, 2} layers, respectively.

It should be noted that there are ST blocks between layers to increase the depth of the model.

Further, the fused image data is first divided into non-overlapping patch vectors through the patch division layer, so that the solar irradiance prediction model can process different parts of the image in parallel and capture local features. Second, a plurality of patch vectors are mapped to higher dimensions through the linear embedding layer, which increases the expression ability of the model and enables the solar irradiance prediction model to capture more complex features. Thereafter, the attention between pixels in the patch or between adjacent patches is calculated by using the plurality of patch vectors through the Swin-Transformer block to establish a relationship between different patches, and capture the global dependence, thus understanding the image content. Finally, the patch vectors are alternately stacked through the patch merging layer and the Swin-Transformer block for multiple times to increase the depth of the model, so that the model captures more complex and abstract features and learn more abundant feature representations.

Finally, after four ST blocks, the depth features of the input fused image data are extracted, and the expression of the extracted depth feature is as follows:

$$Z_{DF} = Swin(x, W_2);$$

where $Z_{DF}$ denotes the extracted depth feature; Swin denotes the backbone network, x denotes the input fused image data, $W_2$ denotes a trainable parameter matrix in the model.

Further, the depth features are fused by using a multilayer perceptron, and the fused depth features are processed by using a Softmax activation function to obtain a short-term irradiance prediction value.

It should be noted that the output of the solar irradiance prediction model can be regarded as a probability distribution, and the model output expression after the activation function processing is as follows:

$$\hat{y} = Softmax(MLP(Z_{DF}, W_3));$$

where MLP denotes a multilayer perceptron; $W_3$ denotes a trainable parameter in a multi-layer perceptron; $\hat{y} \in R^{1*M}$ denotes the output of the solar irradiance prediction model; $\hat{y} \in R^{1*M}$ denotes the output of the solar irradiance prediction model.

Further, the expression output by the solar irradiance prediction model is formulated to obtain:

$$\hat{y} \in F_1(x \cdot W_1);$$

where $F_1( )$ denotes a function of the solar irradiance prediction model denotes; and $W_1$ denotes a trainable matrix parameter in the model.

In the training process, in order to establish the mapping relationship between the input and the target date in the solar irradiance prediction model, it is necessary to train and optimize the parameter $W_1$ of the model. In the present disclosure, the data $y \in R^{1*M}$ obtained after carrying out blurring processing on the measured global horizontal irradiation data is taken as the target data, which is a special probability distribution. Therefore, the KullbackLeibler loss function is used to calculate the similarity between the model output and the target, so as to measure the overall performance of the model. The loss function is defined as:

$$J(W) = \sum_i^N \sum_j^M y_{ij} \log\left(\frac{y_{ij}}{\hat{y}_{ij}}\right);$$

where N denotes the number of samples in a data set; i denotes a sample index; Y denotes the set of data y which has been subjected to blurring processing; $\hat{y}$ denotes the set of the model output value which has been subjected to blurring processing; $y_{ij}$ denotes a j-th element of an i-th sample; $\hat{y}_{ij}$ denotes a j-th element of an i-th value output by the short-term irradiance prediction model.

deblurring processing is carried out on the short-term irradiance prediction value to obtain an actual short-term irradiance prediction value.

Specifically, since the data $y \in R^{1*M}$ obtained after carrying out blurring processing on the measured global horizontal irradiation data is taken as the target data, deblurring processing needs to be carried out on the output of the solar irradiance prediction model, as shown in FIG. 10, to obtain the actual short-term irradiance prediction value. The expression of the GHI prediction value of the time is as follows:

$$y_p = E(\hat{y});$$

where $y_p$ denotes the actual GHI prediction value; and E( ) denotes the mathematical expectation.

In Embodiment 2, the present disclosure shows the prediction results and the errors from Apr. 10 to 17, 2022 in FIG. 12. On April 17, a sunny day, the error of the whole day is within 100 W/m$^2$, and the error between the short-term irradiance prediction value and the real value is relatively small as a whole, which is in line with the technical effect to be achieved by the present disclosure.

Figure 13:
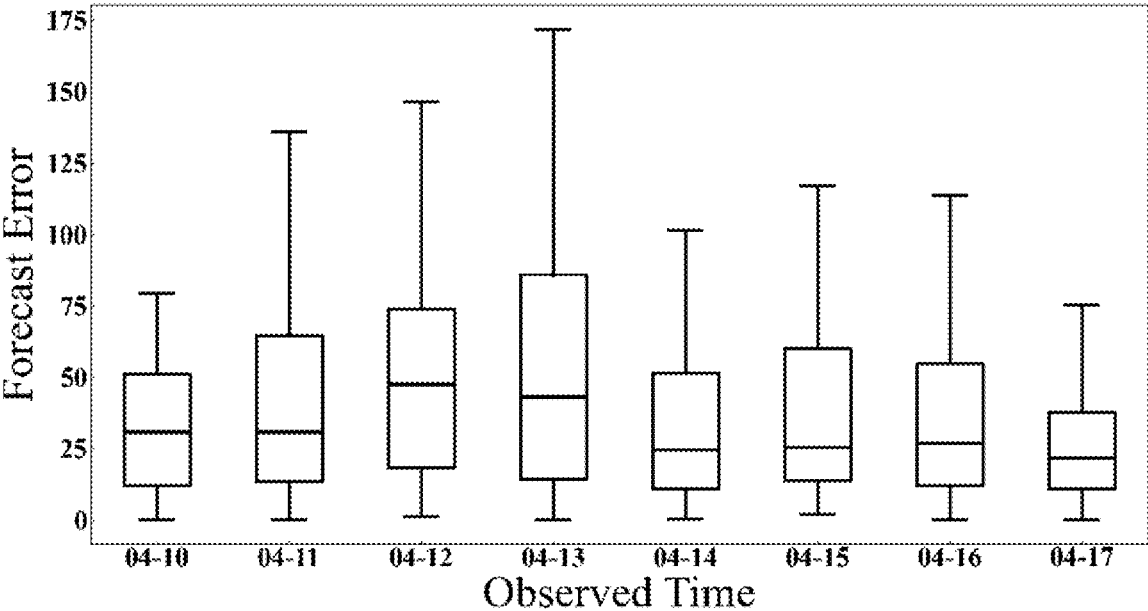
FIG. 13 is a schematic diagram of the prediction result error distribution according to an embodiment of the present disclosure.

As can be seen from FIG. 13, the error distribution of most prediction results in the present disclosure is within 175 W/m$^2$. From the results of the whole test set, in the 10-minute advance task, the index is P95=135.5461, which means that 95% of the prediction errors are lower than 135.5461, and proves that the short-term irradiance prediction method of the present disclosure is more stable.

The present disclosure also uses a Mean Absolute Error (MAE), a Root Mean Square Error (RMSE) and 95th percentile (P95) as indexes to compare the proposed short-term irradiance prediction with the standard SwinTransformer model that uses a single standardized exposed image as inputs and outputs the image according to the classification mode, the time sequence prediction method LSTM (Long Short-Term Memory) not based on images and the image sequence prediction method based on SCNN (Spatial Convolutional Neural Network). The results are shown in Table 1:

TABLE 1

| | Model | MAE[W/M$^2$] | RMSE [W/M$^2$] | P95 [W/m2] |
|---|---|---|---|---|
| Prediction at the 5- minute level | The present disclosure | 32.2119 | 51.9040 | 107.4868 |
| | Swin | 46.3616 | 74.8860 | 158 |
| | SCNN | 40.8789 | 59.9708 | 116.1135 |
| | LSTM | 114.2215 | 173.7966 | 407.02 |
| Prediction at the 10- | The present disclosure | 41.0852 | 64.4043 | 135.5461 |
| | Swin | 61.7113 | 89.8482 | 193 |

TABLE 1-continued

|  | Model | MAE[W/M²] | RMSE [W/M²] | P95 [W/m2] |
|---|---|---|---|---|
| minute | SCNN | 43.5478 | 70.1480 | 150.2094 |
| level | LSTM | 122.5559 | 81.6037 | 277.0784 |
| Prediction | The present disclosure | 35.4198 | 57.8955 | 122.9490 |
| at the 15- | Swin | 51.2733 | 78.2563 | 166 |
| minute | SCNN | 52.3408 | 72.5541 | 144.6121 |
| level | LSTM | 104.1670 | 157.8008 | 363.7023 |

As can be seen from Table 1, the indexes of the short-term irradiance prediction method in the present disclosure, such as a Mean Absolute Error (MAE), a Root Mean Square Error (RMSE) and 95th percentile (P95), are all superior to the SwinTransformer model, the time sequence prediction method LSTM not based on images and the image sequence prediction method based on SCNN for the predictions at the 5-minute level, the 10-minute level, and the 15-minute level, which is in line with the expected effect of the present disclosure.

In Embodiment 3, a short-term irradiance prediction device based on image processing and multimodal data fusion is provided, including:

a blurring processing module, which is configured to acquire irradiance data, and carry out blurring processing on the irradiance data to obtain irradiance data which has been subjected to blurring processing, where the irradiance data which has been subjected to blurring processing includes time information and irradiance information;

a time information layer image generation module, which is configured to convert the time information into an image layer containing the position of the sun based on an astronomical principle and a fish-eye camera image principle, and draw a time information layer image with the solar imaging center coordinate as the center and the radius r;

an image fusion module, which is configured to fuse a normally exposed all-sky image, an underexposed all-sky image and the time information layer image to obtain fused image data; and a prediction module, which is configured to input the fused image data into a pre-built short-term solar irradiance prediction model, output a short-term irradiance prediction value, and carry out deblurring processing on the short-term irradiance prediction value to obtain an actual short-term irradiance prediction value; where taking the irradiance data which has been subjected to blurring processing as the target data, the similarity between the short-term irradiance prediction value and the target data is calculated by using a KullbackLeibler loss function.

In Embodiment 4, a computer-readable storage medium is provided, on which a computer program is stored, where the program, when executed by a processor, implements the steps of the method described in any one of Embodiment 1 and Embodiment 2.

The above is only the preferred embodiment of the present disclosure. It should be pointed out that those skilled in the art can make several improvements and variations without departing from the technical principles of the present disclosure. These improvements and variations should also be regarded as the scope of protection of the present disclosure.

What is claimed is:

1. A short-term irradiance prediction method based on image processing and multimodal data fusion, comprising the following steps:

acquiring irradiance data, and carrying out blurring processing on the irradiance data to obtain irradiance data which has been subjected to blurring processing, wherein the irradiance data which has been subjected to blurring processing comprises time information and irradiance information;

calculating a solar imaging center coordinate based on an astronomical principle and a fish-eye camera image principle, and drawing a circular area with the solar imaging center coordinate as the center and the radius r to generate a time information layer image;

fusing the time information layer image with a normally exposed all-sky image and an underexposed all-sky image which are acquired in advance to obtain fused image data; and inputting the fused image data into a pre-built short-term solar irradiance prediction model, and outputting a short-term irradiance prediction value; wherein the short-term solar irradiance prediction model comprises a patch division layer, a linear embedding layer, a Swin-Transformer block and a patch merging layer, and the step of outputting a short-term irradiance prediction value comprises:

S1, dividing the fused image data into non-overlapping patch vectors through the patch division layer;

S2, mapping a plurality of patch vectors to high dimensions through the linear embedding layer to extract complex features;

S3, calculating the attention between pixels in the patch by using the patch vector through the Swin-Transformer block to establish a relationship between different patches;

S4, alternately stacking the different patches through the patch merging layer and the Swin-Transformer block for multiple times to extract depth features of the fused image data; and S5, fusing the depth features by using a multilayer perceptron, and processing the fused depth features by using a Softmax activation function to obtain a short-term irradiance prediction value; and carrying out deblurring processing on the short-term irradiance prediction value to obtain an actual short-term irradiance prediction value; wherein taking the irradiance data which has been subjected to blurring processing as the target data, the similarity between the actual short-term irradiance prediction value and the target data is calculated by using a KullbackLeibler loss function.

2. The short-term irradiance prediction method based on image processing and multimodal data fusion according to claim 1, wherein the calculation expression of carrying out blurring processing on the irradiance data is as follows:

$$y = \frac{1}{\sqrt{2\pi}\,\sigma} e^{\frac{-(v - y_m)}{2\sigma^2}} \; ;$$

where $y_m$ denotes an average global horizontal irradiance value within a predicted time scale; y denotes the result of blurring of the average global horizontal irradiance; $\sigma$ denotes a Gaussian blur variance; v denotes an irradiance data set, and $\pi$ denotes the ratio of the circumference of a circle to its diameter.

3. The short-term irradiance prediction method based on image processing and multimodal data fusion according to claim 1, wherein generating a time information layer image comprises:

calculating a zenith angle and a solar azimuth angle at local shooting time according to the astronomical principle, and calculating a solar imaging radius according to the fish-eye camera;

using the solar azimuth angle to calculate the solar imaging center coordinate at the local shooting time based on the solar imaging radius; and obtaining the time information layer image by drawing a circular area with the solar imaging center coordinate as the center and the radius r on a background image layer with a preset size.

4. The short-term irradiance prediction method based on image processing and multimodal data fusion according to claim 3, wherein the expression of calculating a zenith angle and a solar azimuth angle at local shooting time is as follows:

$$h_a = 15 \times (t + (L - L_h) - 12);$$

$$\delta = -23.44° \times \cos\left(\frac{2\pi}{365}(N' + 10)\right);$$

$$\theta_s = 90° - \arcsin(\cosh_a\cos\delta\cos\phi + \sin\delta\sin\phi);$$

$$\Psi = \arccos\left(\frac{\sin\delta - \cos\theta_s\sin\phi}{\sin\theta_s\cos\phi}\right);$$

where $h_a$ denotes a solar hour angle at the shooting time; t denotes the time when the all-sky image is taken; L denotes the longitude of the shooting location; $L_h$ denotes a time zone center line at the shooting location; & denotes a declination at the shooting time; N' denotes the number of days in a year; $\theta_s$ denotes a zenith angle at the local shooting time; $\Psi$ denotes a solar azimuth angle at the shooting time; $\phi$ denotes the longitude and the latitude of the time zone center line.

5. The short-term irradiance prediction method based on image processing and multimodal data fusion according to claim 3, wherein calculating a solar imaging radius according to the fish-eye camera comprises:

using a nonlinear fitting method to perform nonlinear correction on the imaging angle for imaging positioning, in which the nonlinear correction has a formula of:

$$\theta = \frac{\log(180 - \theta_s)}{\log 90} \times \theta_s;$$

where $\theta$ denotes a viewing angle after the nonlinear correction;

calculating the solar imaging radius based on the determined imaging positioning, in which the expression of calculating the solar imaging radius is as follows:

$$l = \left(\frac{\theta}{90} \times R\right);$$

where l denotes a solar imaging radius; R denotes a pixel radius of the all-sky image.

6. The short-term irradiance prediction method based on image processing and multimodal data fusion according to claim 1, wherein the expression of calculating the Kullback-Leibler loss function is as follows:

$$J(W) = \sum_i^N \sum_j^M y_{ij}\log\left(\frac{y_{ij}}{\hat{y}_{ij}}\right);$$

where J(W) denotes a loss value of the prediction model; N denotes the number of samples in a data set; M denotes the number of elements in each sample in the data set; i denotes a sample index; j denotes an element index in each sample; $y_{ij}$ denotes a j-th element of an i-th sample; $\hat{y}_{ij}$ denotes a j-th element of an i-th value output by the short-term irradiance prediction model.

7. A non-transitory computer-readable storage medium on which a computer program is stored, wherein the program, when executed by a processor, implements the steps of the method according to claim 1.

8. A short-term irradiance prediction device based on image processing and multimodal data fusion, comprising:

a blurring processing module, which is configured to acquire irradiance data, and carry out blurring processing on the irradiance data to obtain irradiance data which has been subjected to blurring processing, wherein the irradiance data which has been subjected to blurring processing comprises time information and irradiance information;

a time information layer image generation module, which is configured to convert the time information into an image layer containing the position of the sun based on an astronomical principle and a fish-eye camera image principle, and draw a time information layer image with the solar imaging center coordinate as the center and the radius r;

an image fusion module, which is configured to fuse a normally exposed all-sky image, an underexposed all-sky image and the time information layer image to obtain fused image data; and a prediction module, which is configured to input the fused image data into a pre-built short-term solar irradiance prediction model, and output a short-term irradiance prediction value; wherein the short-term solar irradiance prediction model comprises a patch division layer, a linear embedding layer, a Swin-Transformer block and a patch merging layer, and the step of outputting a short-term irradiance prediction value comprises:

S1, dividing the fused image data into non-overlapping patch vectors through the patch division layer;

S2, mapping a plurality of patch vectors to high dimensions through the linear embedding layer to extract complex features;

S3, calculating the attention between pixels in the patch by using the patch vector through the Swin-Transformer block to establish a relationship between different patches;

S4, alternately stacking the different patches through the patch merging layer and the Swin-Transformer block for multiple times to extract depth features of the fused image data; and S5, fusing the depth features by using a multilayer perceptron, and processing the fused depth features by using a Softmax activation function to obtain a short-term irradiance prediction value; and carry out deblurring processing on the short-term irradiance prediction value to obtain an actual short-term irradiance prediction value; wherein taking the irradiance data which has been subjected to blurring processing as the target data, the similarity between the short-term irradiance prediction value and the target data is calculated by using a KullbackLeibler loss function.

\* \* \* \* \*